United States Patent
Nakano

(10) Patent No.: US 6,338,489 B1
(45) Date of Patent: Jan. 15, 2002

(54) MECHANICAL SEAL

(75) Inventor: Kenji Nakano, Weinheim (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/411,583

(22) Filed: Oct. 1, 1999

(30) Foreign Application Priority Data

Oct. 7, 1998 (DE) .......................................... 198 46 153

(51) Int. Cl.$^7$ ................................................ F16J 15/36
(52) U.S. Cl. ........................ 277/385; 277/389; 277/393; 277/397
(58) Field of Search ................................ 277/377, 379, 277/385, 389, 390, 391, 393, 397

(56) References Cited

U.S. PATENT DOCUMENTS

| 2,984,505 A | * | 5/1961 | Andresen et al. |
| 3,372,076 A | * | 3/1968 | Wilkinson |
| 3,554,559 A | * | 1/1971 | DahLheimer |
| 4,063,741 A | * | 12/1977 | Kerr |
| 4,424,975 A | * | 1/1984 | Langebrake |
| RE32,646 E | * | 4/1988 | Wentworth |
| 4,836,560 A | * | 6/1989 | Haberberger |
| 4,840,384 A | * | 6/1989 | Dorsch |
| 5,199,719 A | * | 4/1993 | Heinrich et al. |
| 5,332,361 A | * | 7/1994 | Bras et al. |
| 5,964,466 A | * | 10/1999 | Hintenlang et al. |

FOREIGN PATENT DOCUMENTS

EP        0 390 243        10/1990

* cited by examiner

*Primary Examiner*—Anthony Knight
*Assistant Examiner*—John L. Beres
(74) *Attorney, Agent, or Firm*—Kenyon & Kenyon

(57) ABSTRACT

A mechanical seal including a slide ring and a counter-ring that are axially preloaded against each other along sealing surfaces through the application of spring tension. These surfaces contact each other in a manner that permits the sealing surfaces to rotate relative to each other. The slide ring and a housing, which is arranged in a rotatably fixed manner relative to slide ring, are each sealingly allocated to one end face of a bellows extending in the axial direction. One of the end faces of bellows is allocated nonadherently, with force-locking and/or form-locking, to slide ring, and the other end face of bellows is allocated nonadherently, with force-locking and/or form-locking, to housing.

7 Claims, 1 Drawing Sheet

MECHANICAL SEAL

BACKGROUND OF THE INVENTION

The present invention relates to a mechanical seal of the type including a slide ring and a counter-ring, which, being axially preloaded through the application of spring tension, sealingly contact one another with sealing surfaces in a manner allowing relative rotation. The slide ring and housing, which is arranged in a rotatably fixed manner relative to the slide ring, are each sealingly allocated to one end face of a bellows extending in the axial direction.

A mechanical seal of this kind is described in European patent 0 390 243 A2. The end faces of the bellows are joined adherently to the slide ring and the housing, for example, by welding or cementing, which is not very economical or satisfactory from a production engineering standpoint.

There remains a need to further develop a mechanical seal of this type such that its production cost is markedly reduced due to a simplified manufacture.

SUMMARY OF THE INVENTION

The present invention addresses this need by providing a mechanical seal having a slide ring and counter-ring which are axially preloaded against each other by an applied spring tension so that they contact each other along relatively rotatable sealing surfaces. Also provided is a housing, which is rotatably fixed relative to the slide ring, such that a surface of both the housing and the slide ring is sealed to one end face of an axially extending bellows.

The present invention provides that one of the end faces of the bellows is allocated nonadherently, with force-locking and/or form-locking, to the slide ring, and the other end face of the bellows is allocated nonadherently, with force-locking and/or form-locking, to the housing. Such an arrangement, (which can be carried out by jamming together the end faces of the bellows and the slide ring and the housing) results in the considerable simplification to the manufacture of the mechanical seal. Moreover, a further advantage of this design is that the component parts of the mechanical seal can be replaced very easily in the event of repair. If, for example, the bellows or the slide ring are to be replaced, then one simply loosens the nonadherent connection in the area of the end faces of the bellows, replaces the parts to be changed, and joins the new component parts nonadherently again. In this manner, the cost of repair is reduced to a minimum.

According to one advantageous embodiment, provision can be made for the slide ring and bellows to be connected by a first bearing ring made of polymeric material which at least partially encloses the slide ring on the outer peripheral side. The first bearing ring is enclosed by a clamping ring with radial clearance, and the first end face of the bellows is jammed in the gap formed by the clearance, and, in this manner, is positioned and sealed. The first bearing ring is made of a polymeric material, e.g., FKM (fluorinated polymerizate) and prevents the slide ring, which is mostly made of carbon, from contacting the first end face of the bellows or the generally metallic clamping ring. By using the first bearing ring, the brittle and, therefore, delicate slide ring is largely protected against partial, high mechanical loads of the sort that can reduce its service life. Hence, the mechanical seal exhibits consistently good working properties during a long service life.

The first bearing ring preferably has a reinforcement which is completely enclosed by polymeric material. The reinforcement is mostly made of steel and is protected by the complete covering against corrosion caused by the medium to be sealed. The reinforcement causes an increased stiffness of the first bearing ring and thus provides for an improved seal between the spaces to be sealed against each other.

In addition, the first bearing ring can essentially completely cover the end face of the slide ring facing away from the counterring. By such a design, the sealing surface between the slide ring and the first bearing ring is considerably increased so as to provide an excellent static seal. Because the slide ring is covered by the first bearing ring over a large surface, the delicate surface of the slide ring is well protected.

The second end face of the bellows can encircle an axial flange of the housing on the outside, and be jammed by a retaining ring under radial preloading, preferably without additionally introducing a sealant between the axial flange of the housing and the second end face of the bellows. The radial clamping of the end face on the axial flange by the retaining ring is a simpler design than clamping the component parts in the axial direction. A further advantage is that the movements of the bellows in the axial direction have no influence on the allocation of the end face of the bellows, the axial flange, and the retaining ring relative to each other.

The clamping ring and the retaining ring preferably each has a radial projection to accommodate a pressure spring, under elastic axial preloading, contacting the sides of the radial projections facing each other. Consequently, the bellows and the pressure spring are arranged in a parallel connection in terms of technical function. Mechanical seals where the axial preloading between slide ring and counter-ring arises solely from the bellows itself are not very satisfactory at providing consistently good working properties across a wide temperature range. The material of the bellows is best chosen primarily as a function of the medium to be sealed, and is preferably made of a high-grade steel. Due to the design, the resilience of the bellows is not constant over the required operative range of the mechanical seal. To guarantee a good seal, it is therefore necessary to provide an additional pressure spring which is preferably made of a high-grade steel as well. By functionally separating the bellows and the pressure spring, each of the component parts can be optimally adapted to the specific conditions of the application case.

With the assistance of a second bearing ring made of polymeric material, the counter-ring can be arranged in a grooved recess of a driver, which can be secured in a rotatably fixed manner on a shaft to be sealed, the recess being open in the axial direction toward the slide ring. The second bearing ring, like the first bearing ring, preferably is made of FKM as well, and is primarily intended for the seal between the counter-ring, which is mostly made of silicon carbide, and the driver, which is made of a metallic material. Moreover, manufacturing tolerances of the counter-ring and/or the driver are compensated by the second bearing ring. The second bearing ring, just as the first bearing ring, preferably has an angular design, and preferably covers the outer peripheral area of the counter-ring as well as the end face facing away from the slide ring.

BRIEF DESCRIPTION OF THE DRAWING

An exemplary embodiment of the mechanical seal constructed according to the present invention is explained in greater detail below with reference to accompanying drawing, which provides a schematic cross-sectional view of an embodiment of the invention.

DETAILED DESCRIPTION OF THE INVENTION

Figure 1:
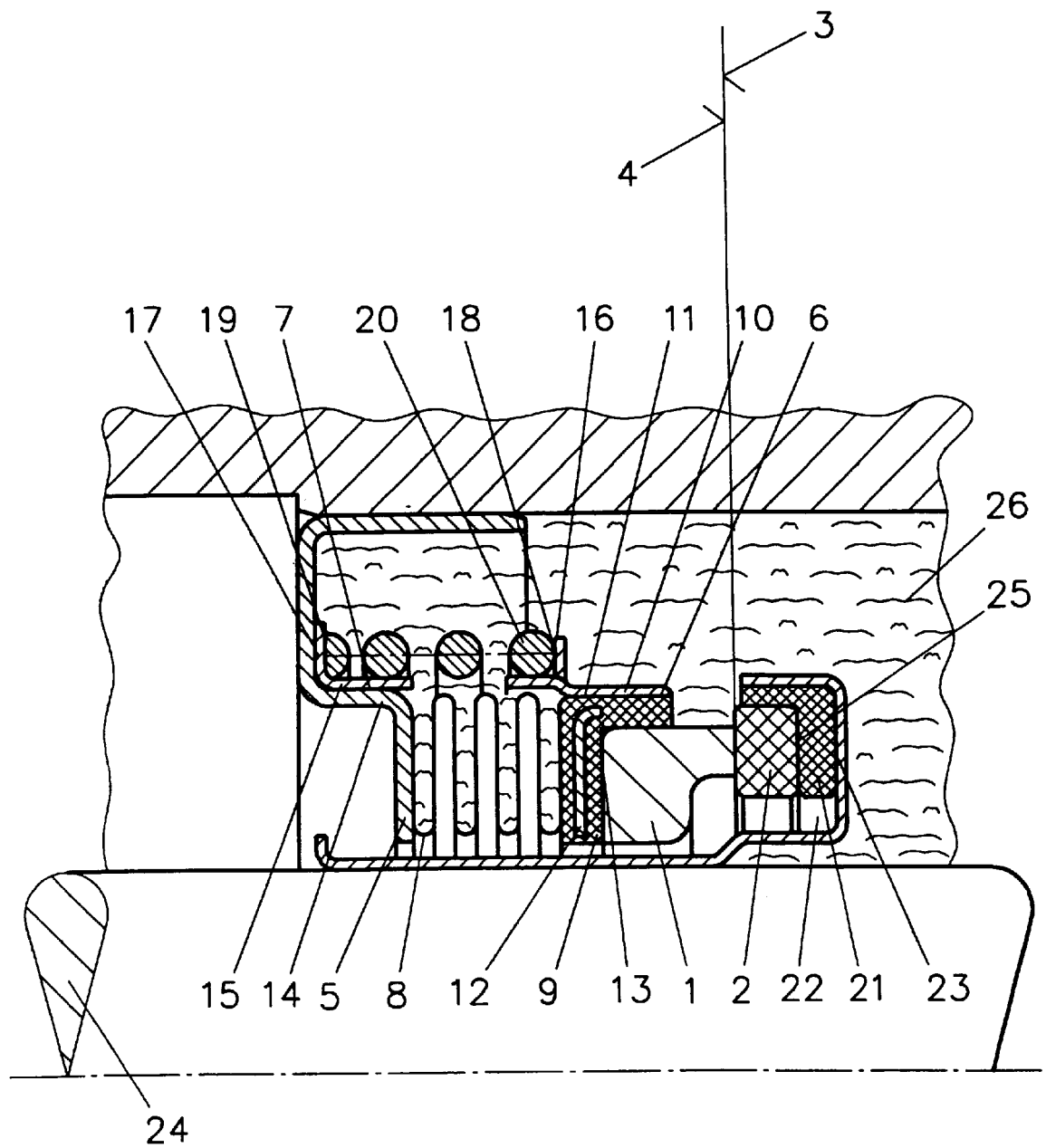

The FIGURE shows an exemplary embodiment of a mechanical seal which is used, for example, in a fuel pump for motor vehicles.

The mechanical seal is composed of a slide ring 1 made of carbon, which, under axial preloading, elastically and sealingly supports itself with its plane sealing surface 3 against sealing surface 4 of counter-ring 2 which is made of silicon carbide.

Both slide ring 1 and counter-ring 2 are encircled by an angular bearing ring 9 or 21, respectively, on the outer peripheral area and in the area of their end faces 13, 25 facing away from each other. First and second bearing rings 9 and 21 are formed of the same material, and, in this preferred embodiment, are each made of FKM.

In this preferred embodiment, the metallic component parts of the mechanical seal are each made of a high-grade steel which is resistant to the medium 26 that is to be sealed off.

The operation of the mechanical seal is as follows: Counter-ring 2, second bearing ring 21, and driver 23 form a preassembled unit which is secured in a rotatably fixed manner on shaft 24 to be sealed.

Slide ring 1, first bearing ring 9, clamping ring 10, bellows 8, housing 5 as well as retaining ring 15, and pressure spring 20 are allocated to each other in a rotatably fixed manner as well.

Pressure spring 20 and bellows 8 are arranged with respect to each other with a functionally parallel connection and cause sealing surfaces 3 and 4 of slide ring 1 and counter-ring 2 to press against each other elastically in the axial direction.

First end face 6 of bellows 8 is allocated nonadherently, in this exemplary embodiment exclusively with force-locking, to slide ring 1, and second end face 7 of bellows 8 is allocated nonadherently, in this exemplary embodiment exclusively with force-locking, to housing 5. Because end faces 7, 8 of the bellows are connected exclusively via a friction fit, both the assembly and the disassembly of the mechanical seal are considerably simplified.

What is claimed is:

1. A mechanical seal, comprising:

a housing;

a slide ring rotatably fixed with respect to the housing, the slide ring having a sealing surface;

a counter-ring having a sealing surface, the slide ring and the counter-ring being axially preloaded against one another so that their respective sealing surfaces are in sealing contact with one another in a manner allowing relative rotation therebetween;

an axially extending high-grade metal bellows having two end faces, one of which is sealingly connected to the housing in a non-adherent manner, and the other of which is sealingly connected to the slide ring in a nonadherent manner;

a first polymeric bearing ring for connecting the slide ring to the bellows, wherein the bearing ring at least partially surrounds the slide ring; and a clamping ring surrounding the first bearing ring with a radial clearance defining a gap sufficient to permit the first end face of the bellows to be forced into the gap formed by the clearance.

2. The mechanical seal as recited in claim 1, wherein the first bearing ring has a reinforcement which is completely enclosed by the polymeric material.

3. The mechanical seal as recited in claim 1, wherein the first bearing ring also covers an end face of the slide ring facing away from the counter-ring.

4. The mechanical seal as recited in claim 1, wherein the other end face of the bellows encircles an axial flange of the housing on the outside, and is jammed by a retaining ring under radial preloading.

5. The mechanical seal as recited in claim 4, wherein the clamping ring and the retaining ring each has a radial projection, and wherein a pressure spring under elastic axial preloading contacts sides of the radial projections facing each other.

6. The mechanical seal as recited in claim 5, wherein the bellows and the pressure spring are parallel to each other.

7. The mechanical seal as recited in claim 1, further comprising:

a driver having a grooved recess that is axially open towards the slide ring; and a second bearing ring made of polymeric material, wherein the counter-ring is arranged in a grooved recess of the driver, and the driver is able to be secured in a rotatably fixed manner on a shaft with respect to which a seal is to be established.

\* \* \* \* \*